F. A. Stuart,
Stump Elevator.
N° 1,579.    Patented Apr. 30, 1840.
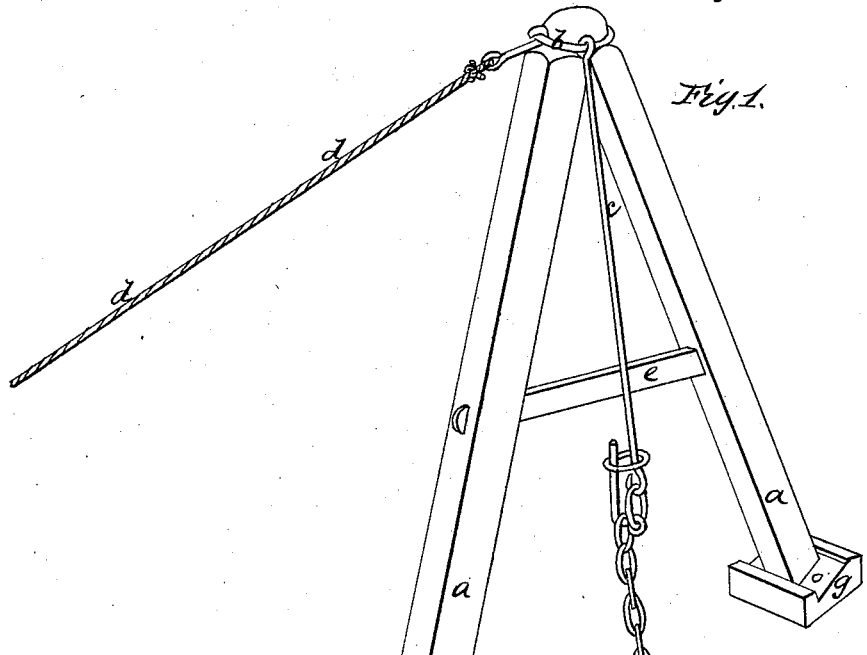
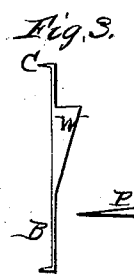
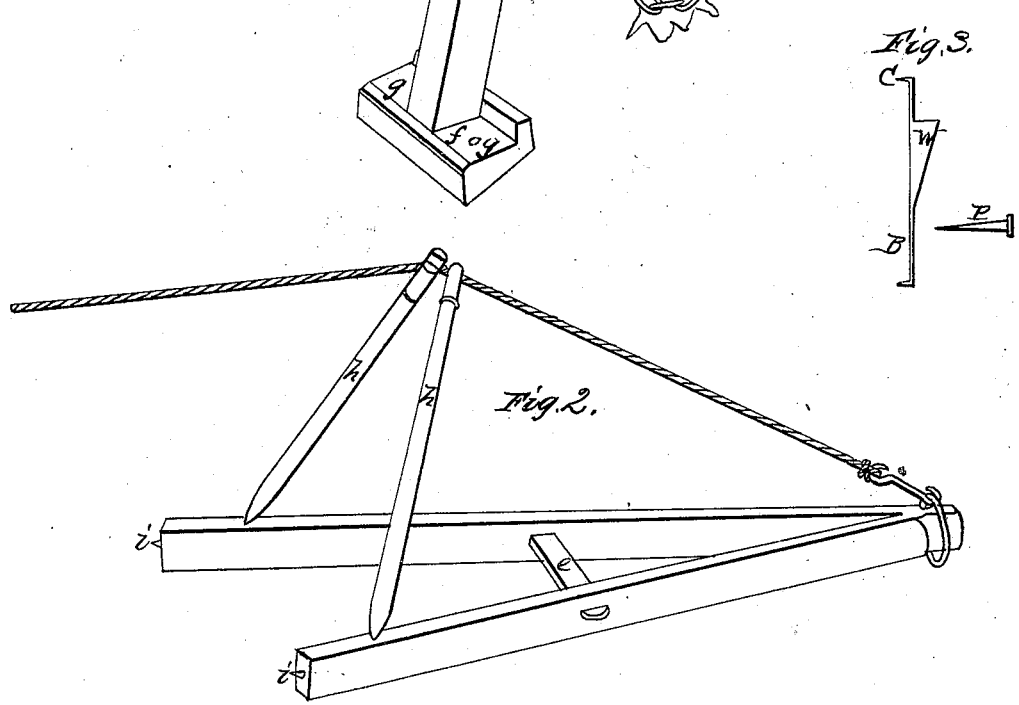

UNITED STATES PATENT OFFICE.

FREDERICK A. STUART, OF CATHARINE, NEW YORK.

MACHINE FOR EXTRACTING STUMPS.

Specification of Letters Patent No. 1,579, dated April 30, 1840.

*To all whom it may concern:*

Be it known that I, FREDERICK A. STUART, of Catharine, in the county of Chemung and State of New York, have invented a new and useful Improvement on Willard Foster's Machine for Extracting Stumps; and I do hereby declare that the following is a full and exact description thereof, reference being had to the annexed drawings of the same, making part of this specification.

The object of my invention is to construct a machine for extracting stumps which shall be simple in its structure and operation and by the aid of which one person with a sufficient motive power, can with advantage perform said operation.

Figure 1 is a perspective view of the machine in a position in which it is used. *a a* are the two legs of a compass-shaped lever of sufficient length and strength—the feet being placed a suitable distance apart and the heads approaching each other and meeting at top confined securely by a ring *b* passing around them. These legs in the operation stand astride the stump, the ring *b* being perpendicularly over the stump so that a lever power is obtained by attaching a rod, chain or line *c* to the ring *b* and to the stump to be extracted. To the opposite side of the ring *b* I attach a rod, chain, or line *d* to which the motive power is attached. *e* is a brace at or near the center of the two legs which is intended for support. In light or alluvial soils the feet of the legs of the lever may rest upon such platforms *f* as are sufficient for support and are prevented from slipping on said platforms by pins *i* Fig. 2 passing from the feet into apertures *g* in said platform.

Fig. 2 represents the machine in its unemployed position lying flat on the ground. In order to elevate or place it in a position ready for use I place two crutches *h h* upon its upper side, which are of a suitable length and which meet at their upper ends.

The above mentioned rod, chain, or line *d* passes from the head of the compass lever over the ends of the crutches and by attaching a motive power to the opposite end of said rod, chain, or line the bottom of the lever being held stationary it is easily raised into a perpendicular or inclined position. It may be remarked that about twenty feet is a suitable length for the legs of the compass lever for extracting stumps on ordinary land and small stumps and for large stumps about thirty feet will answer.

To prevent the chain from slipping I sometimes apply to the side of the stump a hold fast of the following construction. It is composed of a bar of iron B, Fig. 3 with sharp corks *c c* turned at each end for entering the stump and a wedge *w* fastened on the back of said bar with the point toward the ground against which wedge the chain presses while drawing and drives the corks into the stump. The holdfast is placed against the stump and thus held by a pin P driven through an aperture in the same into the stump, the chain is then put around the stump and the holdfast near the point of the latter and secured. When the drawing takes place the action of the chain on the wedge forces the corks into the stump and the wedge prevents the chain from slipping.

What I claim as my invention, and which I desire to secure by Letters Patent, is—

The construction of the lever as before described so that the angle formed by the inclination of the lever and the chain attached to the stump can be decreased at pleasure independent of the size of the stump which is not the case with "Foster's."

FREDERICK A. STUART.

Witnesses:
WM. P. ELLIOT,
EDMUND MAHER.